Figure 1:
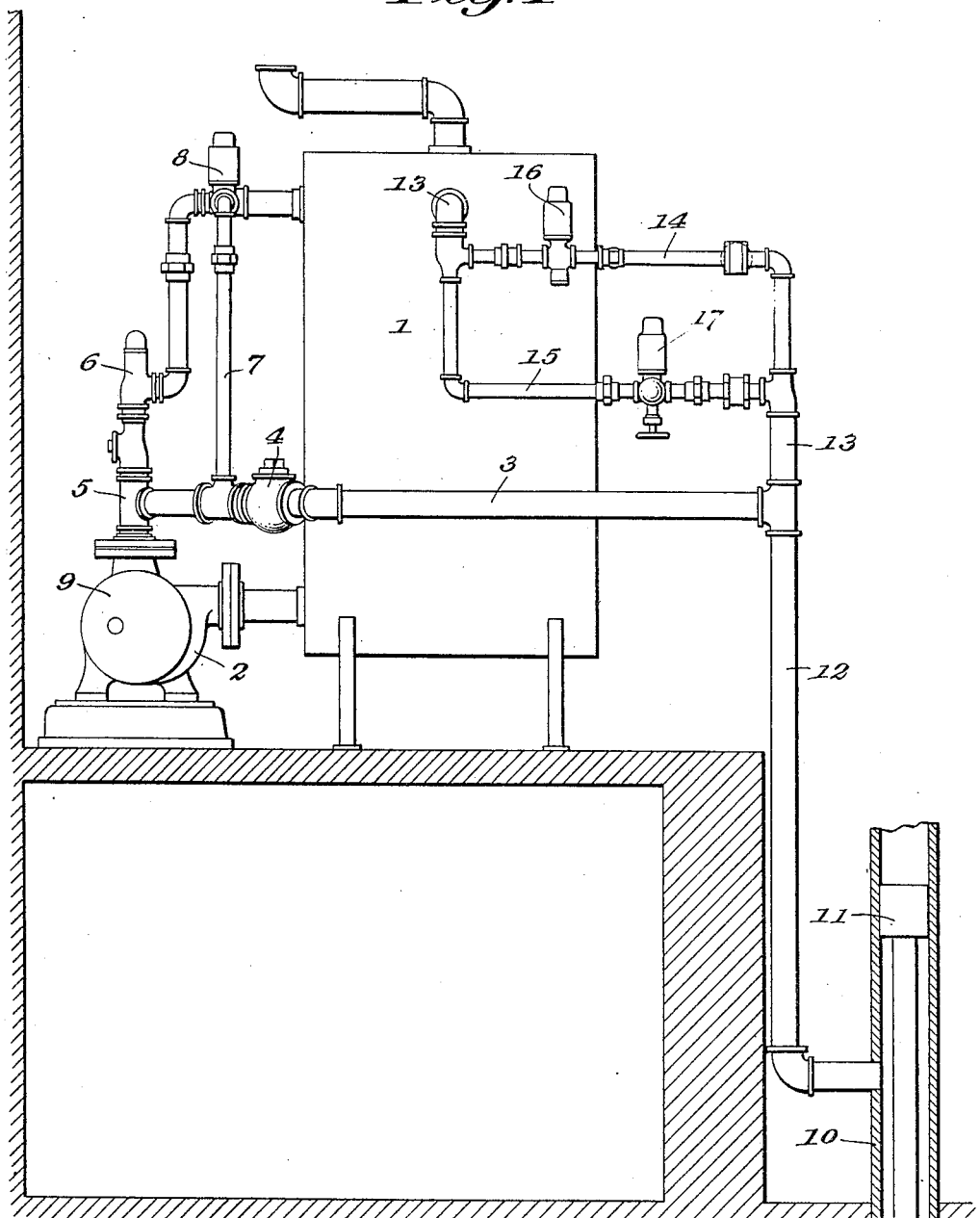

May 11, 1943. A. W. GROTE 2,319,125
OPERATING AND CONTROL SYSTEM FOR HYDRAULIC ELEVATORS
Filed Oct. 15, 1941 2 Sheets-Sheet 2

Inventor
Alfred W. Grote
By
Spear, Rawlings & Spear
Attorneys

Patented May 11, 1943

2,319,125

UNITED STATES PATENT OFFICE 2,319,125

OPERATING AND CONTROL SYSTEM FOR HYDRAULIC ELEVATORS

Alfred W. Grote, Freeport, Maine, assignor to The Portland Company, Portland, Maine, a corporation of Maine Application October 15, 1941, Serial No. 415,101

24 Claims. (Cl. 187—28)

My present invention relates to novel operating and control systems for hydraulic elevators.

While hydraulic elevators have the inherent advantages of positive operation and low operating and maintenance costs, their acceptance has been limited by the fact that their control systems did not compare favorably with those employed in elevator installations utilizing variable speed electric motors.

In accordance with my invention, I provide electrically operated means to regulate the delivery of liquid to and the escape of liquid from the plunger cylinders of hydraulic elevators. By thus regulating the flow of the liquid, I provide not only for desired variations in the rate of elevator ascent or descent, but also, because the regulating means are electrically operated, for the precise manual or automatic control of such speed variations and for the automatic and accurate levelling of the elevator car at each station.

As my invention is well adapted to meet all requirements of any hydraulic installation or to make existing installations fully acceptable as to their operation and control, its general nature may be most conveniently considered in connection with typical hydraulic elevator installations.

Hydraulic elevators include, in general, a delivery system to deliver liquid to the plunger cylinder to raise the elevator and a relief system to control the escape of liquid from the cylinder to permit the elevator to descend. In many installations, the liquid is in a reservoir and the delivery system includes a pump driven by an electric motor. In other installations, the city water system, for example, comprises the source of liquid under pressure. Whether the source of liquid under pressure is the city water system or a reservoir having a pump controlled delivery system, the situation is much the same except that in the former case the pressure is relatively constant and in the latter case, the volume is relatively definite. In either case, I control the effectiveness of the liquid by varying its volume as by control valves in either or both of the systems as required by the particular installation to provide the desired variations in the rate of elevator ascent and descent.

Where the source of liquid is the city or like water system, the volume may be regulated by a single valve having a plurality of operative positions establishing a low speed and a high speed with such intermediate speeds as are desired. A like valve may be employed in the relief or return system of any installation. Where the source of liquid is a reservoir and the delivery system is controlled by a pump, I preferably employ one or more bypasses from the delivery system to the reservoir and in the embodiment of my invention shown in the accompanying drawings I have shown an installation having a pump controlled liquid source with both the delivery system and the relief or return system including bypass conduits each controlled by a valve so that when the pump is operated with the bypass valve closed, a higher rate of elevator ascent is established that when the pump is operated with the bypass valve open. The high rate of elevator descent is established when both valves in the return system are open with low speed descent being effected when the main valve in the return system is closed.

Any desired number of valves may be employed in either the delivery or the return system, but as each of the valves is electrically operated and as the pump is driven by an electric motor, I have maintained the illustrative embodiment of my invention as simple as possible in order to facilitate the appreciation of its several novel features and advantages. The operating circuits to these electrically operated devices include suitable safety controls and operator controls that may be manually or automatically actuated. I also provide for the accurate levelling of the elevator cars at each station, during which operation, the means effecting low speed ascent and descent of the elevator are automatically in control of its travel.

Figure 2:
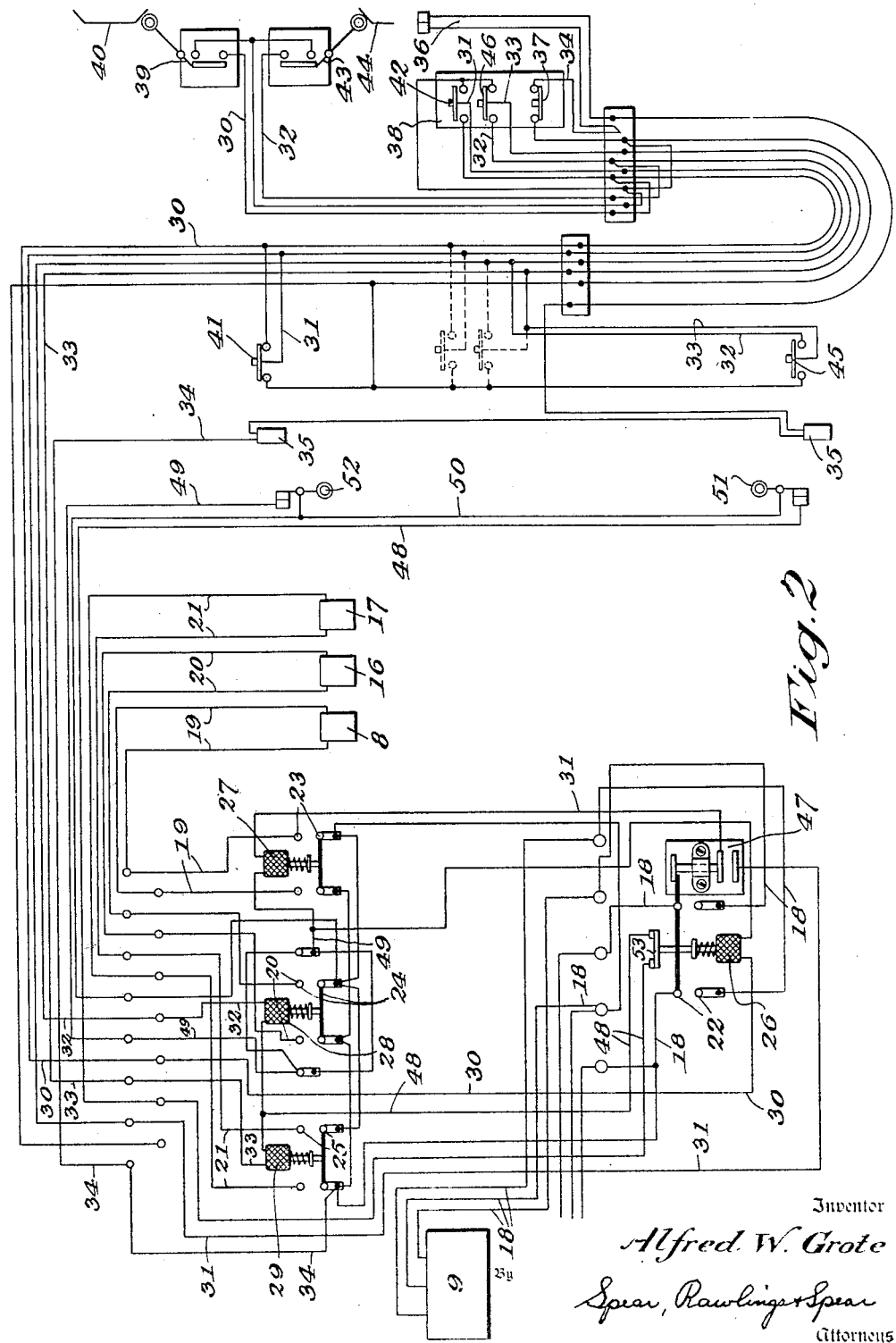

In the drawings:

Fig. 1 is a schematic view showing one embodiment of the apparatus employed to regulate the delivery of liquid to and the escape of liquid from the plunger cylinder of a hydraulic elevator, and Fig. 2 shows a diagram of the circuits employed to actuate the electrically operable means effecting the desired manual and automatic control of the liquid.

In the hydraulic elevator installation selected to illustrate my invention, the liquid is pumped from a reservoir 1 by a pump 2 in the delivery conduit 3 in which is located a check valve 4. A pipe 5 having a relief valve 6 leads from the pump 2 to the reservoir 1 and in accordance with my invention I provide a bypass 7 from the delivery conduit 3 to the reservoir 1. The bypass 7 is controlled by an electrically actuated valve 8 and the pump 2 is driven by an electric motor 9. For reasons that will subsequently be apparent, the valve 8 is normally open and adapted to be electrically closed.

The delivery conduit 3 is connected to the cylinder 10 for the elevator plunger 11 by a pipe 12 also connecting the cylinder 10 to the return system 13 which includes, in the embodiment of my invention shown, a pair of parallel conduits 14 and 15 having normally closed electrically operated valves 16 and 17 respectively.

It will be apparent that when the pump 2 is in operation and the valve 8 is closed, the rate of elevator ascent is greater when the bypass valve 8 is open when some of the liquid is by-passed to the reservoir 1 through the bypass 7. It will also be apparent that the rate of elevator descent will be slower when one of the valves 16, 17 is open than when both are open. It will thus be seen that I have provided means for regulating the delivery and return of liquid to provide definite slow and fast speeds of elevator ascent and descent.

For convenience, the circuits to the electrically operated devices are hereinafter referred to as operating circuits of which in the embodiment of my invention shown in the drawings there are four, the circuit 18 to the motor 9, the circuit 19 to the bypass valve 8, the circuit 20 to the valve 16, and the circuit 21 to the valve 17. The circuits 18, 19, 20, and 21 include normally open switches 22, 23, 24, and 25 respectively. The switches 22, 23, 24, and 25 are closed by magnetically operated means 26, 27, 28, and 29 respectively in the circuits 30, 31, 32, and 33 respectively, hereinafter referred to as control circuits.

All of the control circuits have a common lead 34 in which I provide switches 35 closed when the elevator car doors are closed, a gate control 36, and a stop switch 37 on the car panel 38 whereby the control circuits 30, 31, 32, and 33 are subjected to suitable safety controls.

Since, when the motor 9 is operating with the valve 8 open, low speed elevator ascent is provided, the circuit 18 may be referred to as the low speed operating circuit and the circuit 30 may be referred to as the low speed control circuit. When the motor 9 is operating with the valve 8 closed, high speed elevator ascent results, and accordingly the circuit 19 may be termed the high speed operating circuit and the circuit 31 the high speed control circuit. The control circuit 30 includes a normally open switch 39 on the elevator car to be closed by cams 40 located at each station, while the circuits 30 and 31 are both closed by a switch 41 at each station and by the panel switch 42 in the elevator car.

When both of the valves 16 and 17 are open, high speed elevator descent is effected. When only one of the valves 16, 17 is open, low speed elevator descent results. In the drawings, I have shown the valve 16 as the valve always open when the elevator is descending. The circuit 20 is then the low speed operating circuit and the circuit 21 is the high speed operating circuit. The circuit 32 effecting the closing of the switch 24 may be termed the low speed control circuit while the control circuit 33 effecting the closing of the switch 25 is the high speed control circuit.

The low speed control circuit 32 includes a normally open switch 43 on the elevator car to be closed by cams 44 located at each station. The cams 40, 44 are so located with reference to each other and to the switches 39 and 43 that the switches 39, 43 are both open when the elevator car is properly positioned at each station, but one or the other is closed if the car is either below or above its correct position at the station at which it is to be stopped. The low speed control circuit 32 and the high speed control circuit 33 are both closed by switches 45 at each station or by the operator controlled panel switch 46 in the car.

By this construction, actuation of the switches 41 and 42 establish high speed elevator ascent and the switches 45 and 46 establish high speed elevator descent. When these switches are open at each station and the car is not properly positioned, either of the low speed operating circuits 30 and 32 is automatically closed until the car is accurately levelled.

As the closing of the high speed circuits may result in too rapid acceleration of the speed of the car, I have provided means for effecting a predetermined interval in which the completion of the high speed circuit is delayed during which interval a low speed is maintained ensuring smooth acceleration. In practice, the effect of too rapid acceleration is most noticeable in elevator ascent and accordingly I have indicated at 47 in the high speed operating circuit 31 a self-closing switch adapted to remain open for a predetermined interval after the circuit 31 has been closed, thus ensuring smooth acceleration.

The control circuits 32 and 33 are connected as at 48 and the control circuits 30 and 31 as at 49 to a common ground 50 and have bottom and top limit switches 51 and 52 whereby the circuits 30 and 31 are positively broken when the elevator car approaches the upper limits of its travels and whereby the circuits 32 and 33 are positively broken when the elevator car approaches the bottom limits of its travel. In order to prevent the circuits controlling the descent of the elevator from being closed while the motor 9 is operating, the magnetically operated means 26 also actuates a circuit interrupter 53 in the connection 48.

While operating and control systems in accordance with my invention may be widely varied to meet any desired operating or control requirements, such as full automatic push button or car switch control, and to provide any desired speed variations in the rate of elevator ascent, descent, or both, it will be apparent from the foregoing that the essentials of my invention are means in either or both systems to regulate the liquid to effect the desired speed variations and means effecting low speed operation of the elevator automatically levelling the elevator car at the station at which it is to be stopped.

What I therefore claim and desire to secure by Letters Patent is:

1. An operating system controlling the delivery of liquid to and an escape of liquid from the plunger cylinder of a hydraulic elevator to control its ascent and descent from station to station, said system comprising pump controlled delivery means in communication with said cylinder, said delivery means comprising a motor in control of said delivery means and valve controlled means for regulating the flow of liquid to said cylinder to regulate the rate of elevator ascent, valve controlled means to regulate the escape of liquid from said cylinder to regulate the rate of elevator descent, and operating means in control of said motor and said valve controlled means to provide control of the direction and rate of elevator travel.

2. An operating system controlling the delivery of liquid to and the escape of liquid from the plunger cylinder of a hydraulic elevator to control its ascent and descent from station to station, said system comprising means to deliver liquid under pressure into said cylinder, and relief means to permit the liquid to escape therefrom, valve controlled means for said delivery and relief means to regulate the flow of liquid therethrough to establish high and low rates of speed in at least one direction of elevator travel, and operating means for said valve controlled means, said operating means including an operator control effecting, when actuated, high speed travel, means to automatically level the elevator at the station at which it is to be stopped, said levelling means effecting low speed elevator travel and means automatically effecting low speed elevator travel for a predetermined interval when said operator control is actuated.

3. The operating system of claim 2 in which the operating means consists of an operator control selective of the direction of elevator travel and, when actuated, dominant of the levelling means.

4. An operating system for controlling the delivery of liquid to and the escape of liquid from the plunger cylinder of a hydraulic elevator to control its ascent and descent between stations, said system comprising a source of liquid, check valve controlled means to deliver liquid from said source to said cylinder, a motor to operate said delivery means, a by-pass from said delivery means to said source, and an electrically actuated valve in control of said by-pass, means to return the liquid from said cylinder to said source to permit said elevator to descend, said return means comprising electrically actuated valve means to regulate the escape of liquid from the cylinder to establish at least two predetermined rates of descent, a control for said motor, said by-pass valve and said valve means, said control comprising an electric circuit to effect the operation of said motor with said by-pass valve open for a low speed, an electric circuit to effect the operation of said motor with said by-pass valve closed for a high speed, an electric circuit to said valve means to regulate the escape of liquid for a low speed, an electric circuit to said valve means to regulate the escape of liquid for a high speed, operator controlled means for said high speed circuits, and car levelling means at each station to control said low speed circuits.

5. The elevator operating system of claim 4 in which the electrically operated bypass valve is normally open, the motor and the bypass valve are in separate circuits, the circuit to the motor being closed by the operator controlled means or by the car levelling means, and the circuit to the bypass valve being closed only by the operator controlled means.

6. The elevator operating system of claim 4 in which the electrically operated bypass valve is normally open, the motor and the bypass valve are in separate circuits, the circuit to the motor being closed by the operator controlled means or by the car levelling means, and the circuit to the bypass valve is closed only by the operator controlled means, and including means to delay the closing of the bypass valve for a predetermined interval after the operator controlled means is actuated.

7. An operating system for controlling the delivery of liquid to and the escape of liquid from the plunger cylinder of a hydraulic elevator to control its ascent and descent between stations, said system comprising a source of liquid, check valve controlled means to deliver liquid from said source to said cylinder, a motor to operate said delivery means, a bypass from said delivery means to said source, and an electrically actuated valve in control of said bypass, means to return the liquid from said cylinder to said source to permit said elevator to descend, said return means comprising a pair of parallel conduits, an electrically actuated return valve in each conduit to regulate the escape of liquid from the cylinder to establish two predetermined rates of descent, a control for said motor and said valves, said control comprising an electric circuit to effect the operation of said motor with said bypass valve open for a low speed, an electric circuit to effect the operation of said motor with said bypass valve closed for a high speed, an electric circuit to one of said return valves to regulate the escape of liquid for a low speed, an electric circuit to the other of said return valves to regulate the escape of liquid for a high speed, operator controlled means for said high speed circuits and car levelling means at each station to control said low speed circuits.

8. The elevator operating system of claim 7 in which the operator controlled means effects the closing of both of the circuits to the valves regulating the escape of liquid from the cylinder and the car levelling means control the circuit to the return valve regulating the escape of liquid for a low speed.

9. In an operating system for controlling the delivery of liquid to and the escape of liquid from the plunger cylinder of a hydraulic elevator to control its ascent and descent from station to station, means to deliver liquid under pressure to said cylinder, and means to regulate the escape of liquid from said cylinder, said last named means comprising a pair of parallel conduits, an electrically actuated valve in control of each of said parallel conduits, and a separate operating circuit to each of said valves.

10. An operating system for controlling the delivery of liquid to and the escape of liquid from the plunger cylinder of a hydraulic elevator to control its ascent and descent from station to station, said system comprising at least two electrically operated devices providing when both are actuated a different flow of liquid to said cylinder than when one is actuated to provide a fast and slow rate of ascent, at least two electrically operated means to control the escape of liquid from said cylinder and providing when both are actuated a different rate of escape than when one is actuated to establish a fast and slow rate of descent, an electric circuit to effect the operation of one of said first-named devices, an electric circuit to effect the operation of both of said first-named devices, one of said circuits being the low speed circuit, and the other of said circuits being the high speed circuit, a circuit to effect the operation of one of said second-named devices, a circuit to effect the operation of both of said first-named devices, one of said last-named circuits being a high speed circuit and the other of said circuits being a low speed circuit, operator controlled means for said high speed circuits and elevator levelling means in control of said low speed circuits to automatically level the elevator at the station at which it is to be stopped.

11. The operating system of claim 10, in which means are employed to effect automatically when the operator controlled means is actuated for high speed elevator ascent, a low speed ascent of the elevator for a predetermined interval.

12. An operating system for controlling the delivery of liquid to and the escape of liquid from the plunger cylinder of a hydraulic elevator to control its ascent and descent from station to station, said system comprising a motor and a normally open electrically closed valve providing when both are actuated a different flow of liquid to said cylinder than when one is actuated to provide a fast and slow rate of ascent, at least two electrically operated means to control the escape of liquid from said cylinder and providing when both are actuated a different rate of escape than when one is actuated to establish a fast and slow rate of descent, electric circuit to effect the operation of said motor, an electric circuit to effect the operation of said motor and said valve, one of said circuits being the high speed circuit and the other of said circuits being the low speed circuit, a circuit to effect the operation of one of said second-named means, a circuit to effect the operation of both of said first-named means, one of said last-named circuits being a high speed circuit and the other of said circuits being a low speed circuit, operator controlled means for said high speed circuits, and means in control of said low speed circuits to level automatically the elevator at the station at which it is to be stopped.

13. An operating system for controlling the delivery of liquid to and the escape of liquid from the plunger cylinder of a hydraulic elevator to control its ascent and descent from station to station, said system comprising delivery means including a motor and a normally open electrically closed valve to provide when said motor is operating a low speed rate of elevator ascent and when said motor is operating and said valve closed a high speed rate of elevator ascent, and liquid return means including a pair of normally closed electrically opened valves providing when one is open, a low speed rate of elevator descent and when both are open, a high speed rate of elevator descent, a first circuit including said motor, a second circuit including said motor and said electrically closed valve, a third circuit including one of said electrically opened valves, a fourth circuit including both of said electrically opened valves, an operator control for operating said first and second or said third and fourth circuits, and elevator levelling means at each station for operating said first and third circuits.

14. The system of claim 13, in which the second circuit includes means to effect a predetermined delay in the closing of the valve after the starting of the motor by said operator control.

15. An operating system for controlling the delivery of liquid to and the escape of liquid from the plunger cylinder of a hydraulic elevator to control its ascent and descent from station to station, said system comprising pump controlled means to deliver liquid to said cylinder, said means including an electric motor, a bypass and a normally open electrically closed valve in control of said bypass and means controlling the escape of liquid from said cylinder, said means including a pair of electrically actuated devices each adapted to provide a definite regulation of the escape of liquid from said cylinder, a first operating circuit to said motor effecting when closed low speed elevator descent, a normally open switch in said circuit, a first control circuit including a switch operable by the elevator as it approaches a station and an electrically operable device to close said open switch in said first operating circuit, a second operating circuit including said normally open bypass valve, a second control circuit including an electrically operated device to close said second operating circuit, an operator controlled switch to close said first and second control circuits simultaneously to effect the operation of said motor with said bypass valve closed for high speed elevator ascent, a third operating circuit to one of said devices regulating the escape of liquid from the cylinder, a third control circuit including a switch operable by the elevator as it approaches a station and an electrically operated device to close said third operating circuit to regulate the escape of liquid for low speed elevator descent, a fourth operating circuit including the other device regulating the escape of liquid from the cylinder, and a fourth control circuit including an electrically operated device to close said fourth operating circuit, and an operator control switch to effect the simultaneous closing of said third and fourth control circuits for a high speed elevator descent.

16. The system of claim 15 in which the second control circuit comprises means delaying for a predetermined interval the closing of said second operating circuit after said operator controlled switch is actuated.

17. The system of claim 15 in which all of the control circuits have a common lead, and switches in the lead closed only when the elevator may be safely operated.

18. The system of claim 15 in which the first and second control circuits include a common switch opened by the elevator as it approaches the upper limits of its travel and the third and fourth control circuits include a common switch opened by the elevator as it approaches the lower limits of its travel.

19. The system of claim 15 in which the first control circuit includes means automatically holding the third and fourth control circuits open.

20. An operating system controlling the delivery of liquid to and the escape of liquid from the plunger cylinder of a hydraulic elevator to control its ascent and descent from station to station, said system comprising a delivery conduit in communication with the cylinder to deliver fluid thereto from a source of liquid under pressure, an exhaust conduit in communication with the cylinder and the delivery conduit, electrically actuated valve means in control of the conduits to establish three main operating arrangements in one of which the delivery conduit is connected to the cylinder to raise the plunger, in the second of which the delivery conduit is disconnected from the cylinder and the exhaust conduit is connected thereto to permit the plunger to lower and in the third of which both conduits are closed thereby to entrap liquid in the cylinder to hold the plunger in a predetermined position, said valve means providing an additional operative arrangement in which the flow of the liquid through one of the conduits is regulated to provide low speed elevator travel when that conduit is connected to the cylinder, and control circuits for said electrically actuated valve means to effect each operative arrangement, the valve means being further characterized by the blocking of the delivery conduit whenever the valve operating means is actuated to lower the plunger.

21. An operating system for controlling the delivery of liquid to and the escape of liquid from the plunger cylinder of a hydraulic elevator to control its ascent and descent between stations, said system comprising check valve controlled means to deliver liquid from a source to said cylinder, a motor to operate said delivery means, exhaust means in communication with said cylinder, valve means in control of said exhaust means, means in control of said delivery and exhaust means to vary the flow of liquid therethrough to vary the rate of elevator travel, electrically actuated valve means to render said control means operative, and operating means in control of said motor and said electrically actuated valve means to provide control of the direction and rate of elevator travel.

22. In an operating system for controlling the delivery of liquid to and the escape of liquid from the plunger cylinder of a hydraulic elevator to control its ascent and descent from station to station, means to deliver liquid under pressure to said cylinder and means to regulate the escape of liquid from said cylinder, said last-named means comprising electrically actuated valve means having two operative positions to regulate the flow through said discharge means to provide two different rates of elevator descent, and a separate operating circuit in control of said valve means to effect each operative position.

23. In an operating system for controlling the delivery of liquid to and the escape of liquid from the plunger cylinder of a hydraulic elevator to control its ascent and descent from station to station, check valve controlled means to deliver liquid under pressure to said cylinder and means to control the escape of liquid from said cylinder, said first-named means comprising a pump, a motor to operate said pump, and electrically actuated valve controlled means to effect a predetermined reduction in the volume of liquid delivered by said pump to said cylinder.

24. The system of claim 23, in which the valve controlled means includes a by-pass conduit, an electrically actuated valve and a separate operating circuit is provided for the motor and for the electrically actuated valve.

ALFRED W. GROTE.